United States Patent [19]

Ishihara et al.

[11] Patent Number: 4,607,956

[45] Date of Patent: Aug. 26, 1986

[54] POSITION DETECTING APPARATUS

[75] Inventors: Atsushi Ishihara; Tomohisa Yoshimaru, both of Yokohama, Japan

[73] Assignee: Tokyo Shibaura Denki Kabushiki Kaisha, Kawasaki, Japan

[21] Appl. No.: 580,184

[22] Filed: Feb. 15, 1984

[30] Foreign Application Priority Data

Feb. 17, 1983 [JP] Japan .............................. 58-22148[U]

[51] Int. Cl.⁴ ........................................... G01B 11/14
[52] U.S. Cl. ............................. 356/375; 250/237 G; 340/347 P; 33/125 A
[58] Field of Search ............... 356/373, 374, 375, 395; 250/237 G; 340/347 P; 33/125 A, 125 C

[56] References Cited

U.S. PATENT DOCUMENTS 4,135,086  1/1979  Baba ............................... 250/237 G
4,409,479 10/1983  Sprague et al. ................. 250/237 G

FOREIGN PATENT DOCUMENTS 3150349  8/1982  Fed. Rep. of Germany .
 181434 11/1982  Japan .

OTHER PUBLICATIONS

Patent Abstracts of Japan, vol. 2, No. 130, Oct. 28, 1978, p. 7957 E 78.
Roberts, Machine Design, vol. 50, No. 1, Jan. 1978, pp. 104–109.

Primary Examiner—F. L. Evans
Attorney, Agent, or Firm—Cushman, Darby & Cushman

[57] ABSTRACT

A position detecting apparatus provided with a photosensor for optically detecting the scale pattern of an optical scale which moves together with the optical head of the optical disk instrument, and generating an analog signal which corresponds to a pitch of the scale graduation. The photosensor has a light receiving surface, whose width is half the pitch of the scale graduation, and the analog signal of the photosensor is converted to digital signals by means of an A/D converter the digital signals corresponding to a plurality of level signal components of the analog signal. The digital data thus obtained are added or subtracted according to the moving direction of the optical head, thus enabling the position of the optical head to be detected.

3 Claims, 4 Drawing Figures

POSITION DETECTING APPARATUS

BACKGROUND OF THE INVENTION

The present invention relates to a position detecting apparatus for detecting the position of an optical head of the optical disk apparatus.

In case of detecting the position of the optical head in the optical disk apparatus, position determining is needed to be accurate in milimeter or smaller units. The conventional optical-detecting device employs the principle of grid superposition to achieve the position determination. According to the position determination, an optical scale having a grid pattern is arranged opposite to a mask which also has the same grid pattern as that of the optical scale. The mask is fixed while the optical scale is moved together with the optical head. A light receiving element is attached to the mask, opposite to the optical scale, and serves to convert the light, which enters into it through the optical scale and the mask, to an electric signal. Since the condition, under which the grid pattern of the optical scale is superposed upon that of the mask, is changed according to the movement of the optical scale, the quantity of light entering into the light receiving element changes accordingly, thus causing the light receiving element to provide an electric signal that corresponds to the changing quantity of light. Zero-crossings of the electric signal are detected and an address counter counts up or down in response to the zero-crossings, so that the position of the optical head may be detected according to the contents of the address counter.

The contents of the address counter represent a value corresponding to one pitch of degree of the optical scale, and the electrical dividing method is thus used in order to obtain a measured value smaller than the pitch. According to the method, two signals, different by 90° in phase and obtained from the light receiving element, are divided by dividing resistors to four signals which are shifted by 45° from one another. Each of these signals is converted to a rectangular wave, and pulses are formed corresponding to the rising and falling edges of the rectangular wave. A scale, resulting from dividing one pitch to eight equal parts, is thus obtained according to the method.

The conventional position-detecting device, as described above, needs a more complicated means to realize the electrical dividing method and also requires that the pitch of the optical scale be made substantially smaller because measuring pulses must be provided to correspond to the finely-divided scale.

SUMMARY OF THE INVENTION

The object of the present invention is to provide a position detecting apparatus, in which it is unnecessary to make the pitch of its optical scale smaller and its signal process line more complicated.

According to the present invention, a photosensor is arranged face to face with an optical scale, which has grid segments formed according to a certain pitch. The photosensor has a light receiving surface whose width is about half the pitch of the grid segments and converts light entering into the light receiving element through the optical scale, to an electric signal corresponding to the quantity of said light changing according to the movement of the optical scale. The electric signal, which corresponds to one pitch, is divided into plural or four level signal components, for example, and these signal components are digitalized. The position of a moving object can be detected in a pitch smaller than the pitch of the optical scale by adding or subtracting the digital values of the digital signals according to the direction in which the moving object moves.

DETAILED DESCRIPTION OF THE PREFERRED EMBODIMENT

Figure 1:
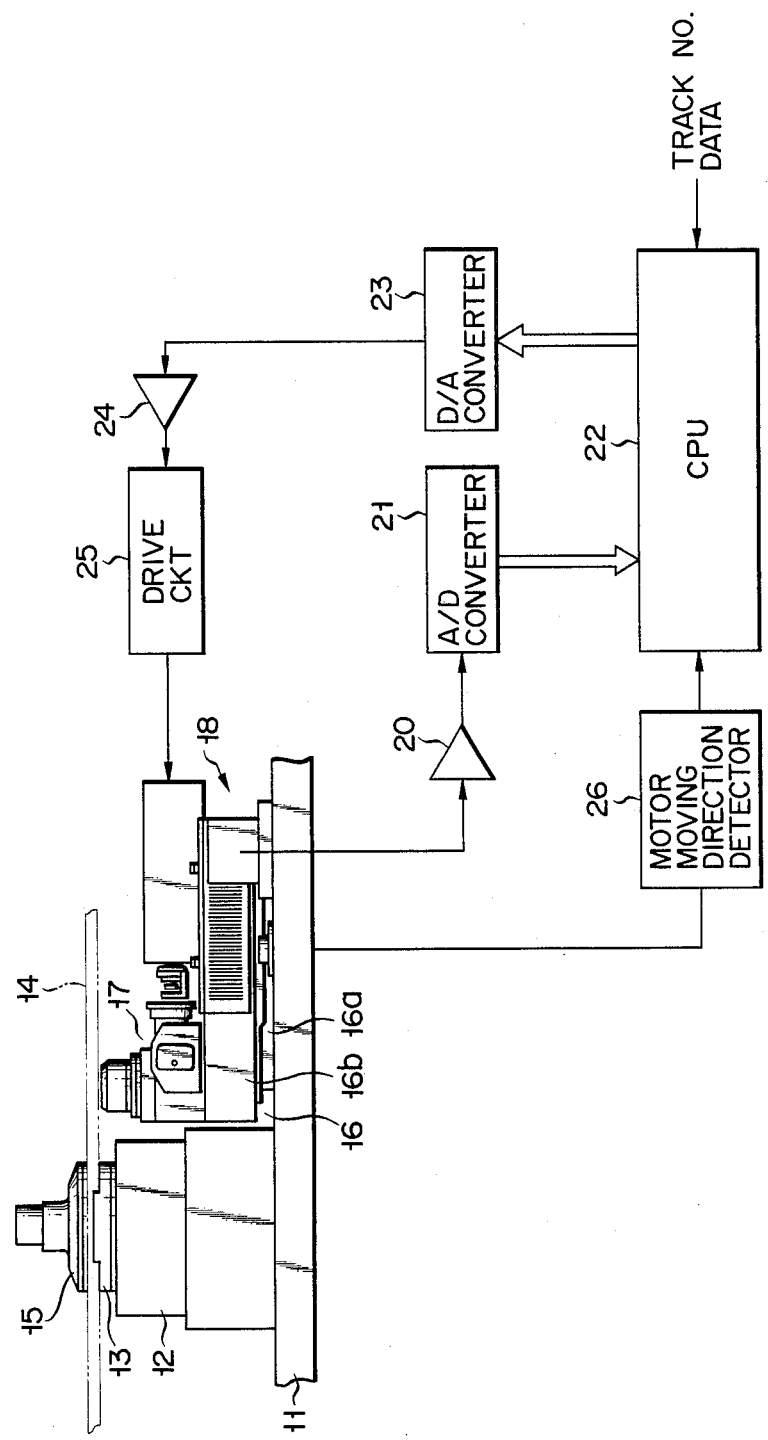
FIG. 1 is a block circuit diagram showing a position detecting apparatus, according to the present invention.
Figure 2:
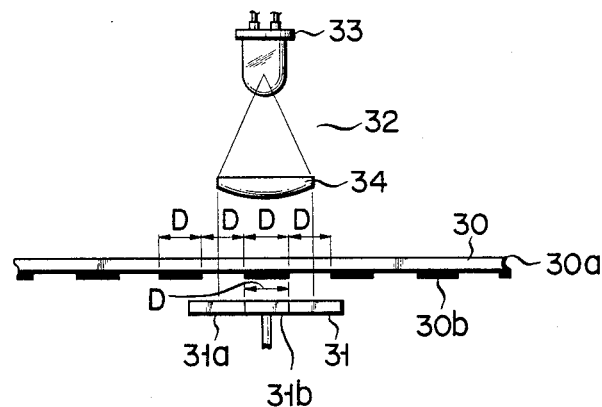
FIG. 2 is a side view showing an optical position-detecting section in the position detecting apparatus.
Figure 3:
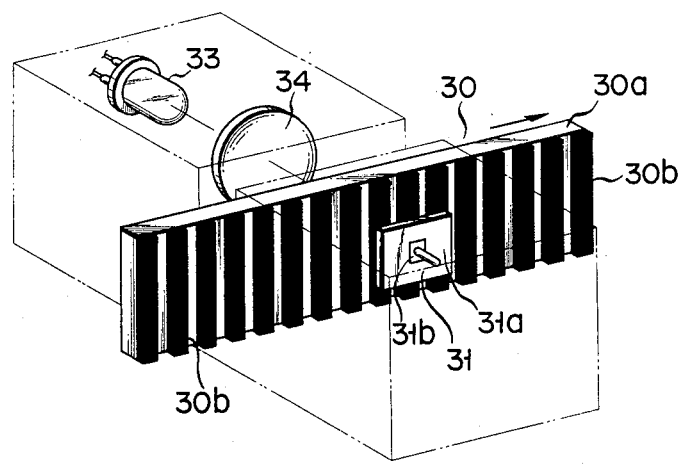
FIG. 3 is a perspective view showing the position detecting section in FIG. 2.

Referring to FIG. 1, a motor 12 is attached to a base plate 11, and a turntable 13 is fitted onto a shaft of the motor 12. An optical disk 14 is mounted on the turntable 13 and brought into press-contact with a damping member 15. A stator 16a of a linear motor 16 is fixed on the base plate 11 and an optical head 17 is attached to an armature 16b of the linear motor 16. Further arranged on the base plate 11 is an optical position detector 18 for detecting the position of the optical head 17. The output terminal of the optical position detector 18 is connected to an A/D converter 21 through an amplifier 20. The output terminal of the A/D converter 21 is connected to a CPU 22. The output port of the CPU 22 is connected to a D/A converter 23. The output terminal of the D/A converter 23 is connected to a motor driving circuit 25 via an amplifier 24. A motor moving direction discriminator 26 is connected to the armature 16b of the linear motor 16. The optical position detector 18 is attached to the armature 16b of the linear motor 16 and has an optical scale 30 which moves together with the armature 16b, and a photosensor 31 which is fixed on the base plate 11 to face the optical scale 30, as shown in FIGS. 2 and 3. A light source 32 is arranged opposite to the photosensor 31 with the optical scale 38 interposed between them. The light source 32 comprises a light emitter (light-emitting diode) 33 and a colimator lens 34. The optical scale 30 includes an optical transparent plate 30a on which grid segments 30b each D (e.g. 8 μm) wide are arranged with a distance of D (e.g. 8 μm) interposed between them. One pitch of the optical scale corresponds to a distance from the foremost end of one grid segment to that of its adjacent grid segment. The photosensor 31 includes a photoelectric element 31b, masked by a mask 31a, which has an opening whose width is D. Namely, the light receiving surface of the photosensor 31 has a width half the pitch (or 2D) of the optical scale.

When the desired track-number information is applied from a host computer (not shown), for example, the CPU 22 converts the track number to a desired address. The desired address is compared with a position address, which represents the present position of the optical head. When the desired position does not correspond to the present position, a start signal is supplied to the D/A converter 23 and converted to an analog signal. When the analog signal is supplied to the motor drive circuit 25, via the amplifier 24, the motor drive circuit 25 drives the linear motor 16.

Figure 4:
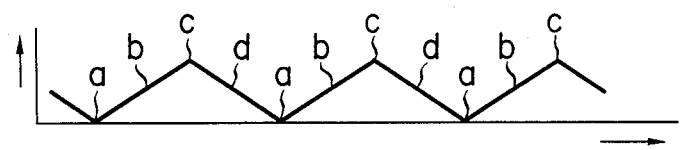
FIG. 4 is a waveform diagram showing an electric signal obtained from a light receiving element.

When the linear motor 16 is driven, the optical scale 30 moves together with the optical head 17, thus causing the photosensor 31 of the optical position detector 18 to apply a position detecting signal to the A/D converter 21 via the amplifier 20. Such a signal, as shown in FIG. 4, is applied from the photosensor 31 in this case. When the signal is supplied to the A/D converter 21, level signal components, a, b, c and d, which are obtained by dividing one scale wave to four equal parts, are digitalized and converted to digital signals of 00, 08, 16 and 08; said one scale wave corresponding to one pitch of the scale. When the digital signal is applied to the CPU 22, it is converted to a position address. The CPU performs addition or subtraction between the position address and the desired address, according to the forward or backward moving information applied from the motor moving direction discriminator 26. More specifically, when the digital signals 00, 08, 16 and 08 are applied to the CPU 22 and the motor moving direction discriminator 26 discriminates that the motor is moving in a direction A the contents of internal register, which correspond to the present position address, are added. When the discriminator 26 discriminates that the motor is moving in a direction B, the contents of the internal register are subtracted. The motor-moving direction discriminator 26 may use the back electromotive force of the motor 16 to discriminate whether the motor 16 is moving backward or forward. When the contents of the internal register are renewed, as described above, and the position address coincides with the desired address, the CPU 22 supplies a motor stop signal to the motor drive circuit 25 through the D/A converter 23 and the amplifier 24. The motor drive circuit 25 stops the linear motor responsive to the motor stop signal.

As described above, position detection can be achieved in a more finely divided scale without making the signal process circuit complicated when the output signal of the photosensor, which corresponds to one pitch of the optical scale, is divided to plural equal parts and these signal components are digitalized.

Although the optical position detector, employed in the above-described embodiment, has been of the light penetration type, it may be of light reflection type.

What is claimed is:

1. A position detecting apparatus comprising:
    an optical scale having a grid pattern, said optical scale being movable in conjunction with a moving member, said grid pattern being formed as a scale graduation and having grid segments disposed at a predetermined pitch;
    scale detecting means including: a mask having an opening with a width which is substantially one-half the pitch of said grid segments and a photoelectric element being masked by said mask, said scale detecting means converting light which has passed through said optical scale and said opening of said mask to an analog signal which corresponds to the pitch of said grid segments said analog signal having a plurality of level signal components;
    digitizing means for extracting selected signal components from said level signal components of said analog signal of said scale detecting means, which correspond to the pitch of said grid segments, said digitizing means converting said signal components to digital data; and
    position information means for converting said digital data of said digitizing means to position information of said moving member.

2. A position detecting apparatus, according to claim 1, wherein said digitizing means includes an A/D converter for converting every level of said analog signal of said scale detecting means to a digital signal.

3. A position detecting apparatus, according to claim 1, further including means for detecting the moving direction of said moving member, so that said position information means receives digital data supplied from said digitizing means as the moving member moves, and adds or subtracts said digital data, according to the direction of said moving member, to obtain said position information.

* * * * *